(12) United States Patent
Oh

(10) Patent No.: US 7,170,257 B2
(45) Date of Patent: Jan. 30, 2007

(54) CARD TYPE DEVICE SERVING AS SUPPLEMENTARY BATTERY AND HOST USING THE SAME

(75) Inventor: Jae-one Oh, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 410 days.

(21) Appl. No.: 10/298,602

(22) Filed: Nov. 19, 2002

(65) Prior Publication Data
US 2003/0094924 A1 May 22, 2003

(30) Foreign Application Priority Data
Nov. 20, 2001 (KR) ............... 2001-72469

(51) Int. Cl.
*H02J 7/00* (2006.01)
(52) U.S. Cl. ..................................... 320/106
(58) Field of Classification Search ............... 320/106, 320/110, 118, 125, 127, 128, 137, 138; 429/96, 429/97, 98, 99, 100
See application file for complete search history.

(56) References Cited

U.S. PATENT DOCUMENTS

| | | | | |
|---|---|---|---|---|
| 5,848,298 | A * | 12/1998 | Steere et al. ................... 710/62 |
| 6,052,742 | A * | 4/2000 | Kirinaka et al. ............... 710/10 |
| 6,173,350 | B1 * | 1/2001 | Hudson et al. ............. 710/100 |
| 6,232,750 | B1 * | 5/2001 | Podrazhansky et al. ..... 320/139 |
| 6,237,048 | B1 * | 5/2001 | Allen et al. ..................... 710/8 |
| 6,385,468 | B2 * | 5/2002 | Arnold ........................ 455/572 |
| 6,562,510 | B1 * | 5/2003 | Chiang et al. ............... 429/100 |
| 6,804,541 | B1 * | 10/2004 | Muramatsu et al. ......... 455/573 |
| 2001/0003941 | A1 * | 6/2001 | Sawada et al. ............... 84/601 |
| 2001/0044330 | A1 * | 11/2001 | Arnold ........................ 455/572 |

FOREIGN PATENT DOCUMENTS

| | | | |
|---|---|---|---|
| GB | 2262170 A | * | 6/1993 |
| JP | 08138013 A | * | 5/1996 |
| JP | 09128114 A | * | 5/1997 |
| JP | 2001067152 | * | 3/2001 |
| JP | 2001266955 | * | 9/2001 |

* cited by examiner

*Primary Examiner*—Pia Tibbits
(74) *Attorney, Agent, or Firm*—Staas & Halsey LLP

(57) ABSTRACT

A card type device serving as a supplementary power supply device, and a host using the same. The card type device may include a battery provided in a frame to serve as a supplementary power supply to the host, a connector to connect to the host for an interfacing of power and data to and/or from the host, a battery charging/discharging circuit to charge the battery with an input power supplied via the connector, and to output the power of the battery via the connector. A power input/output controller provides the host with information of attributes of the battery during a connection to the host, with the power input/output controller to control the battery charging/discharging circuit so that the power of the battery is supplied to the host when a request for power supply is transmitted from the host. The power input/output controller controls the battery charging/discharging circuit so that the battery is charged with the input power when the battery is completely discharged. Further, the battery charging/discharging circuit is a smart battery circuit, and the smart battery circuit provides the host with information of attributes of the battery via an address pin of the connector. The information of the attributes of the battery, provided to the host, include at least one of a battery voltage, a battery remnant, battery charging times, a battery manufacturer, and a battery manufacturing period.

12 Claims, 10 Drawing Sheets

CARD TYPE DEVICE SERVING AS SUPPLEMENTARY BATTERY AND HOST USING THE SAME

CROSS-REFERENCE TO RELATED APPLICATIONS

This application claims the benefit of Korean Patent Application No. 2001-72469 filed on Nov. 20, 2001, in the Korean Intellectual Property Office, the disclosure of which is incorporated herein by reference.

BACKGROUND OF THE INVENTION

1. Field of the Invention

The present invention generally relates to a card type device and a host using the same. In particular, the present invention relates to a card type device serving as a supplemental battery in addition to performing its basic functions, and a host using the same.

2. Description of the Related Art

Generally, a card type device, such as a PCMCIA card, in accordance with the Personal Computer Memory Card International Association (PCMCIA) standard like PCMCIA Spec. 2.1 or a CF card in accordance with the Compact Flash (CF) standard like Compact Flash Spec. 1.4, is connected to portable devices, e.g., laptop computers, for the purpose of expanding functions of the portable devices, such as providing input/output or supplementary storage, for example. The manufacturers of such card type device and the manufacturers who use such card type devices specified particular rules in relation to the physical/electrical format between the two types of devices, e.g., data format and data interfacing, and have been manufacturing products according to such particular rules, thereby enabling one card type device to be compatibly used in various types of devices.

Specifications for the card type devices include the specification for power supply, and FIG. 1 schematically shows a conventional power interface between a host and a PCMCIA/CF card. Referring to FIG. 1, the PCMCIA/CF card 20 is provided with a PCMCIA/CF controller 14 and a ground GND for supplying power VCC from a power supply 12 of the host 10. In other words, the specification for the conventional PCMCIA/CF card 20 specifies that the power be supplied from the host 10 to the PCMCIA/CF card 20 for the input/output operations or reading/writing operations of the PCMCIA/CF card 20. According to the specification, the PCMCIA/CF card 20 is constructed to operate simply as an input/output card or a memory. FIG. 2 is an illustration of an exploded perspective view of the conventional CF card, and FIG. 3 is an illustration of a perspective view showing a frame of the conventional PCMCIA card.

However, there are considerable problems with this conventional power supply specification between the host 10 and the PCMCIA/CF card 20. One of these problems is that since the power is supplied only from the host 10 to the PCMCIA/CF card 20, the power is consumed relatively fast when the card type device is used. For example, when the PCMCIA/CF card 20 is used in portable devices like a personal digital assistant (PDA), as the power is used for the PCMCIA/CF card 20, the battery of the PDA is consumed rapidly. As a result, use time of the host becomes shortened.

Considering the fact that there have been an increasing number of telephone and data communication functions added to portable devices like PDAs, it is expected that the power consumption of the portable devices will greatly increase. Accordingly, a battery of large capacity will be required for the portable devices.

SUMMARY OF THE INVENTION

Accordingly, it is an object of the present invention to provide a card type device that is usable for the purpose of a supplementary battery as need arises, in addition to the basic function as a memory for various devices, and a host using the card type device.

Additional objects and advantages of the invention will be set forth in part in the description which follows and, in part, will be obvious from the description, or may be learned by practice of the invention.

The above and other objects may be accomplished by a card type device serving as a supplementary power supply device according to the present invention, including a battery, a connector for connecting to a host for an interfacing of power and data, and a battery charging/discharging circuit operating to charge the battery with external power, supplied via the connector, and to supply power externally via the connector. A power input/output controller provides the host with information of attributes of the battery during a connection to the host, with the power input/output controller to control the battery charging/discharging circuit so that the power of the battery is supplied to the host when a request for power supply is transmitted from the host. The power input/output controller controls the battery charging/discharging circuit so that the battery is charged with the input power when the battery is completely discharged. Further, the battery charging/discharging circuit is a smart battery circuit, and the smart battery circuit provides the host with information of attributes of the battery via an address pin of the connector. The information of the attributes of the battery, provided to the host, include at least one of a battery voltage, a battery remnant, battery charging times, a battery manufacturer, and a battery manufacturing period.

The above and other objects may be accomplished by a card type device serving as a supplementary power supply device according to the present invention, including a battery provided in a frame of the card type device to serve as a supplementary power supply to a host, a connector to connect to the host for an interfacing of power and data to and/or from the host, and a battery charging/discharging circuit to charge the battery with an input power supplied via the connector, and to output the power of the battery via the connector. The battery charging/discharging circuit is a constant voltage circuit operating to convert the power from the battery into a constant voltage and to output the constant voltage via the connector, and to charge the battery with the input power. The constant voltage circuit includes a plurality of constant voltage converting units to convert the power from the battery into different levels of constant voltages, and a constant voltage selecting switch to output the constant voltage, as selected from the plurality of constant voltage converting units, to a power terminal of the connector.

The above and other objects may be accomplished by a host using a card type device serving as a supplementary power supply unit according to the present invention, including a power supply unit to supply a power to respective components of a body, with the power being supplied from an output power of a card type device connected to the body, a power control unit to control an input power, supplied to the card type device, according to a control signal, and a card type device controller to control the power control unit to detect whether a battery is present in the card type device, to cut off the input power to the card type device when the card type device has the battery, and to charge the power supply unit with the output power supplied from the card type device. When the card type device is connected, the card type device controller supplies the input power as a pulsed power to allow for the detection of whether the battery is present in the card type device, and when a signal level of a LOW-region of the pulsed power is detected to be high, the card type device controller determines that the card type device includes the battery.

When the detected the signal level is not high, the card type device controller may determine a type of the card type device based on an information of attributes of the connected card type device, and when the card type device is determined to have the battery, the card type device controller may supply the output power to the battery.

The above and other objects may be accomplished by a host using a card type device serving as a supplementary power supply unit according to the present invention, including a power supply unit to supply a power to respective components of a body, with the power being supplied from an output power of a card type device connected to the body, a power control unit to control an input power, supplied to the card type device, according to a control signal, a card type device controller to control the power control unit to detect whether a battery is present in the card type device, to cut off the input power to the card type device when the card type device has the battery, and to charge the power supply unit with the output power supplied from the card type device, a user interface provided for a user to designate whether the battery of the card type device is to be used to supply power, and a controller to cause the output power to be supplied to the card type device, irrespective of whether the card type device has the battery, in response to designation, through the user interface, that the battery of the card type device is not to be used to supply power.

The above and other objects may be accomplished by a host using a card type device serving as a supplementary power supply unit according to the present invention, including a power supply unit to supply a power to respective components of a body, with the power being supplied from an output power of a card type devise connected to the body, a power control unit to control an input power, supplied to the card type device, according to a control signal, and a card type device controller to control the power control unit to detect whether a battery is present in the card type device, to cut off the input power to the card type device when the card type device has the battery, and to charge the power supply unit with the output power supplied from the card type device. The card type device controller reviews the information of attributes of the card type device to detect whether the card type device has the battery, and in response to determining, based on the information of the attributes, that the card type device has the battery, the card type device controller transmits a power supply request signal to the card type device according to a charging level of the battery.

The above and other objects may be accomplished by method of operating a host with a connected card type device according to the present invention, including determining whether the card type device includes a power source, controlling a power source of the host to provide a power for the host, when the card type device does not include a power source, controlling the power source of the host and the power source of the card type device to provide the power to the host, when the card type device includes a power source, and supplying the power for the host to respective components of the host. The determining whether the card type device includes the power source includes supplying a pulsed power to the card type device and reviewing whether a signal level of a low region of the pulsed power is high or low.

Operating the host with the connected card type device may include automatically, in response to determining that the card type device includes a power source, controlling the power of the host to be from only the power source of the host when the power source of the card type device is discharged. Further, the determination of the discharge of the power source of the card type device may be determined by a smart battery circuit.

Operating the host with the connected card type device may include providing power from the host to the card type device to charge the power source of the card type device.

Operating the host with the connected card type device may include automatically controlling the power of the host to only be from the power source of the card type device when the power source of the card type device is charged. Further, the determination of the charge of the power source of the card type device may be determined by a smart battery circuit.

According to embodiments of the present invention, while operating as an ordinary card type device, the card type device may also be usable as a supplementary power supplying unit for various components external the card type device. Accordingly, a host using the card type device, according to embodiments of the present invention, may have a longer operating time when used with the supplementary power supply unit from the card type device.

BRIEF DESCRIPTION OF THE DRAWINGS

These and other objects and advantages of the present invention will become apparent and more readily appreciated from the following description of the embodiments, taken in conjunction with the accompanying drawings of which.

DETAILED DESCRIPTION OF THE PREFERRED EMBODIMENTS

Figure 1:
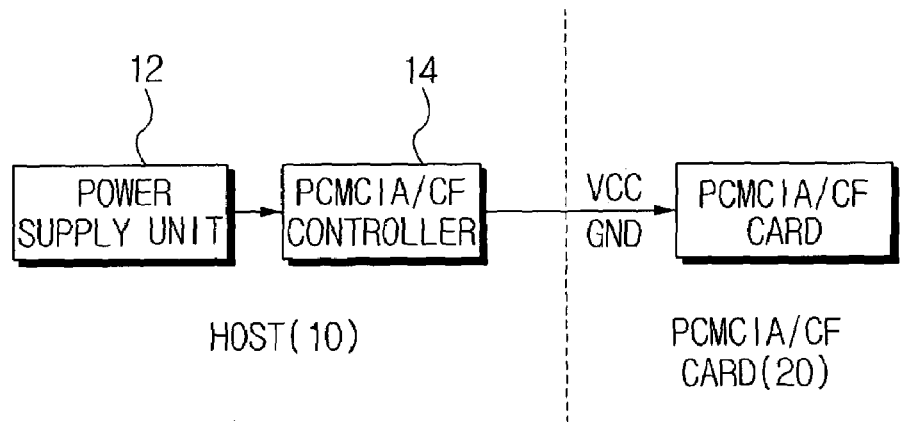
FIG. 1 is a block diagram showing a conventional power interface between a conventional PCMCIA or CF card and a host.
Figure 2:
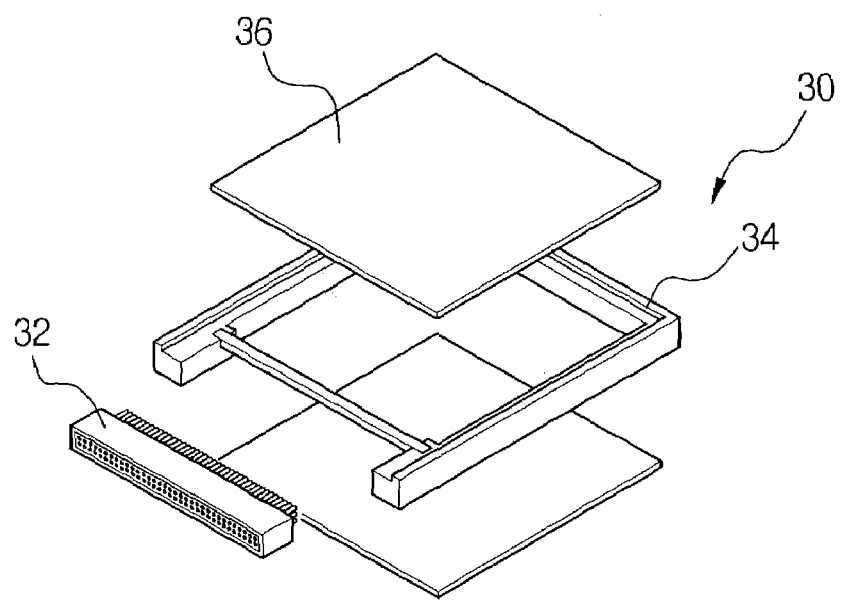
FIG. 2 is an illustration of an exploded perspective view of the conventional CF card.
Figure 3:
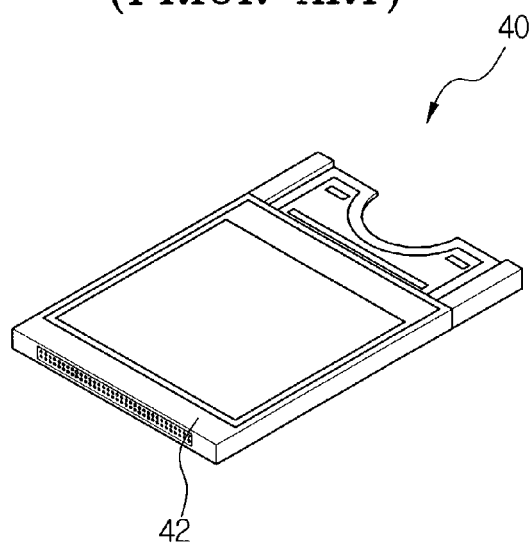
FIG. 3 is an illustration of a perspective view of a frame of the conventional PCMCIA card.

Reference will now be made in detail to the embodiments of the present invention, examples of which are illustrated in the accompanying drawings, wherein like reference numerals refer to the like elements throughout. The embodiments are described below in order to explain the present invention by referring to the figures.

Figure 4:
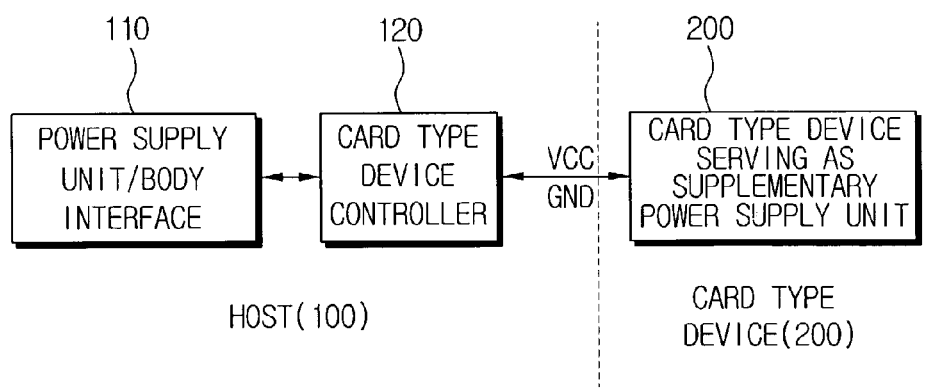
FIG. 4 is a block diagram showing a power interface between a card type device and a host, according to an embodiment the present invention.

FIG. 4 is a block diagram explaining a principle of the present invention, showing a power supply between a card type device 200 serving as a supplementary power supply unit and a host 100 using the card type device 200. Referring to FIG. 4, a card type device controller 120 of the host 100 provides the card type device 200 with power VCC supplied from a power supply 110 and a ground GND, and also provides a power supply/body interface 110 with power supplied from the card type device 200 serving as the supplementary power supply unit.

Figure 5:
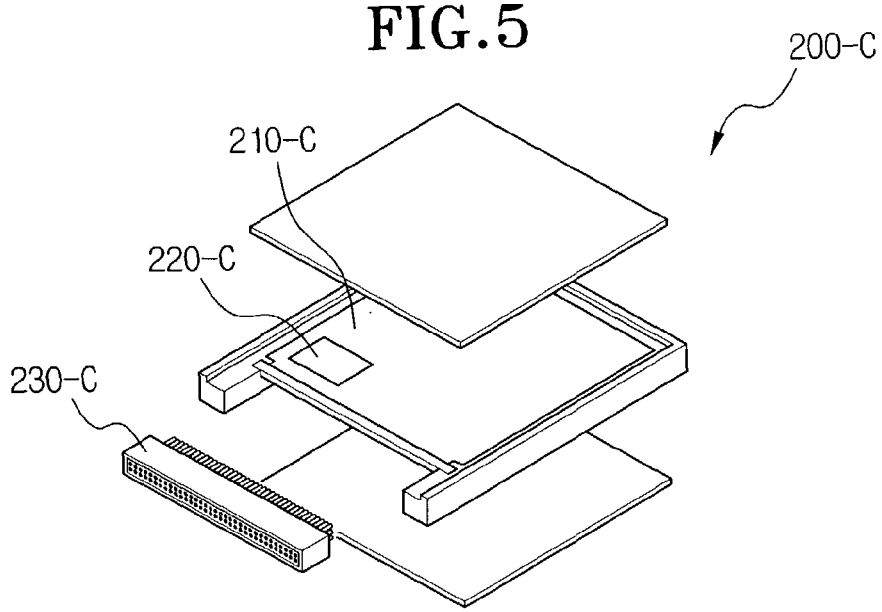
FIG. 5 is an illustration of an exploded perspective view of a battery installed in a CF card, according to an embodiment of the present invention.

FIG. 5 illustrates an exploded perspective view of a CF card 200-C serving as the supplementary power supply unit according to an embodiment of the present invention. The CF card 200-C includes a battery 210-C, which may be formed of a lithium ion battery or lithium polymer battery, in the frame. The use of a lithium ion battery or lithium polymer battery enables the card 200-C to be slim or thin. The battery 210-C is connected to a battery charging/discharging circuit 220-C. The battery charging/discharging circuit 220-C is connected to a power terminal of a connector 230-C, which is constructed in a manner to allow an interface with the host 100.

Figure 6:
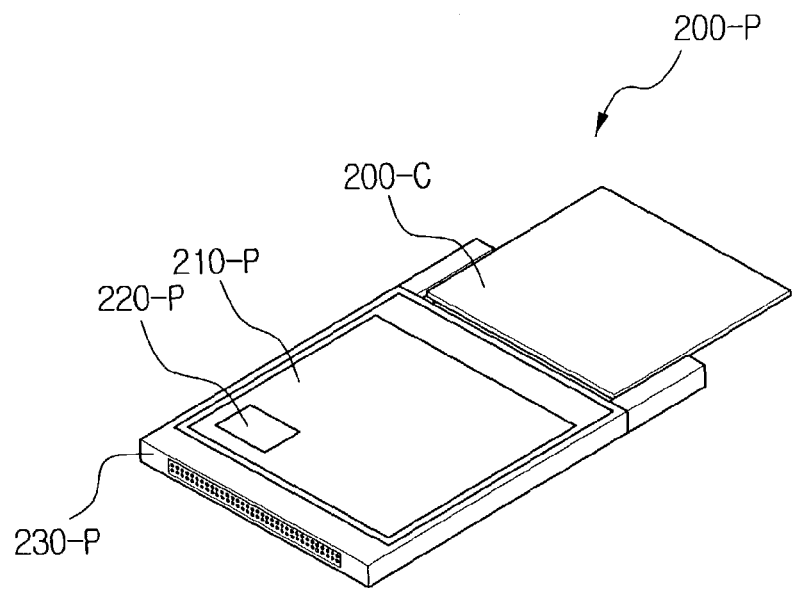
FIG. 6 is an illustration of a perspective view of a battery installed in a PCMCIA card, according to an embodiment of the present invention.

FIG. 6 illustrates a perspective view showing a battery being installed in a PCMCIA card 200-P, serving as the supplementary power supply unit, according to an embodiment of the present invention. Like the CF card 200-C, the PCMCIA card 200-P is also provided with a battery 210-P in the frame. The battery 210-P may also be formed of a lithium ion battery or lithium polymer battery. The battery charging/discharging circuit 220-P is connected to the battery 210-P, and also to a power terminal of a connector 230-P, which is constructed in a manner to allow the interface with the host 100.

Figure 7:
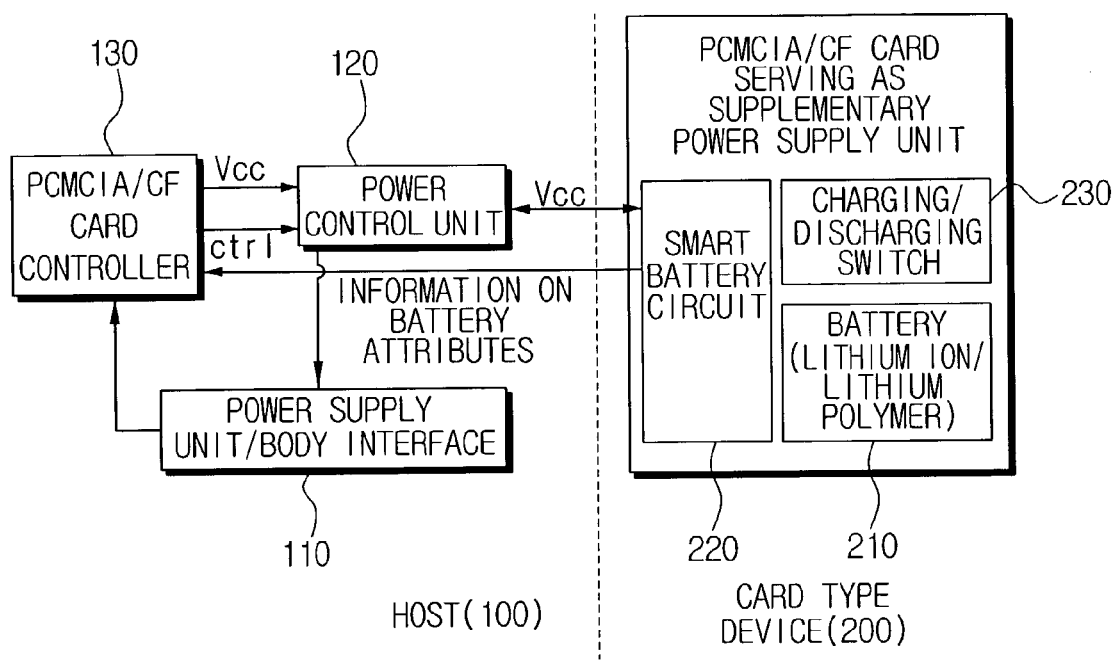
FIG. 7 is a block diagram showing a power interface between a PCMCIA or CF card and a host, according to an embodiment of the present invention.

FIG. 7 is a block diagram showing the power supply 110 between the PCMCIA/CF card 200 and the host 100.

The PCMCIA/CF card 200, serving as the supplementary power supply unit, includes a battery 210 formed of either a lithium battery or a lithium polymer battery, for example, a smart battery circuit 220 for providing the host 100 with the information on the attributes of the battery 210, while operating as the battery charging/discharging circuit, and a charging/discharge switch 230 provided for a user to manually control the operation of the battery charging/discharging circuit 220.

The information about the battery attributes, which is provided by the smart battery circuit 220 to the host 100, can include a battery voltage, battery remnant, battery charging times, battery manufacturer and battery manufacturing period, for example.

When the user switches on the charging/discharging switch 230, the smart battery circuit 220 is converted to a charging circuit, so that the battery 210 can be charged by an external power supply fed through the electric connecting pin of the connector. When the user switches off the charging/discharging switch 230, the smart battery circuit 220 is converted to a discharging circuit, so that the power charged in the battery 210 can be supplied outside the PCMCIA/CF card through the electric connecting pin of the connector.

Here, regardless of the switching of the charging/discharging switch 230, the smart battery circuit 220 can be automatically converted between the charging circuit state and the discharging circuit state. When the battery 210 is charged, the smart battery circuit 220 is set to operate as the discharging circuit.

Meanwhile, the host 100 includes respective blocks (not shown) for basic operations of the host 100, a power supply unit 110, a power control unit 120 and a PCMCIA/CF card controller 130.

The power supply unit 110 supplies the power to the respective blocks (not shown) of the host 100 and the connected PCMCIA/CF card 200. The power control unit 120 controls the power supply to the connected PCMCIA/CF card 200 according to a control signal. The PCMCIA/CF card controller 130 detects whether the battery in the PCMCIA/CF card 200 is present, and when the PCMCIA/CF card 200 is detected as the charged battery 210, the PCMCIA/CF card controller 130 cuts off the power to the PCMCIA/CF card 200. Then, the PCMCIA/CF card 200 controls the power control unit 120 so that the power supply unit 110 can be charged with the power from the PCMCIA/CF card 200, to thereby supply power to the respective blocks.

Figure 8:
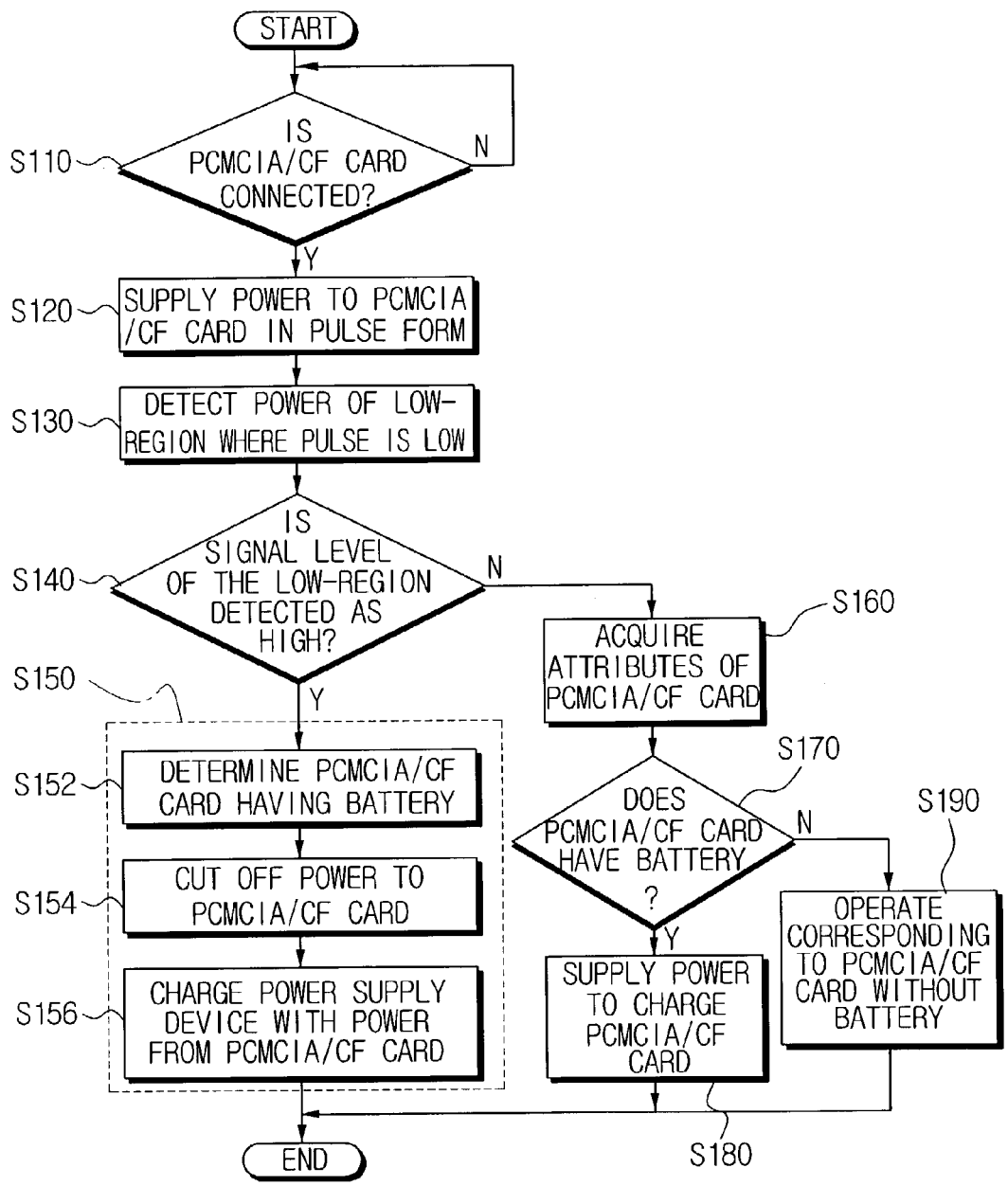
FIG. 8 is a flowchart showing a process of a controller of the PCMCIA or CF card of FIG. 7, according to an embodiment of the present invention.

FIG. 8 is a flowchart showing the operations of the PCMCIA/CF card controller 130 of FIG. 7. First, when the PCMCIA/CF card 200 is connected (operation S110), the PCMCIA/CF card controller 130 supplies the power VCC, in pulse form, to the PCMCIA/CF card 200 (operation S120). Then the PCMCIA/CF card controller 130 detects the signal level of the LOW-region of the pulsed VCC, where the pulse power supplied to the PCMCIA/CF card 200 is low (operation S130). When the signal level of the LOW-region of the pulsed VCC is detected as being high (operation S140), the PCMCIA/CF card 200 is controlled so that the general operations of the host 100 can be performed using the power supplied from the connected PCMCIA/CF card 200 (operation S150). In other words, when the signal level of the LOW-region of the VCC is high (operation S140), the PCMCIA/CF card controller 130 determines the connected PCMCIA/CF card 200 has a battery (operation S152), and accordingly controls the power control unit 120 to cut off the power VCC to the PCMCIA/CF card 200 (operation S154), and controls the power control unit 120 so that the power supply unit 110 can be charged with power from the PCMCIA/CF card 200 (operation S156).

Alternatively, the power from the PCMCIA/CF card 200 may not be transmitted to the power supply unit 110 via the power control unit 120, but instead directly supplied to the respective blocks of the host 100 via a body interface (not shown).

Meanwhile, when it is detected that the signal level of the LOW-region of the VCC is low (operation S140), the information about the attributes of the connected PCMCIA/CF card 200 is acquired from the smart battery circuit 220 (operation S150). When it is determined that the connected PCMCIA/CF card 200 has a battery based on such acquired information (operation S170), the power VCC is supplied to the PCMCIA/CF card 200 to charge the battery. If the acquired information indicates that the connected PCMCIA/CF card 200 is an ordinary PCMCIA/CF card (step S170) without a battery, operations of the host and PCMCIA/CF card are controlled to operate as with ordinary PCMCIA/CF cards (operation S190).

Meanwhile, if there is a user interface (not shown) provided for a user to predesignate whether to use the battery of the PCMCIA/CF card 200, the user can thereby determine not to use the battery 210 of the PCMCIA/CF card 200 by setting such through the user interface. For this purpose, the host 100 can further include a control unit, e.g., a controller included in the PCMCIA/CF card controller 130, to control the operations of the PCMCIA/CF card 200 to operate as an ordinary PCMCIA/CF card 200, i.e., a PCMCIA/CF card without a battery, irrespective of whether the PCMCIA/CF card 200 has the battery 210. As for the user interface, a generally used user interface may be a key input unit (not shown) and/or a display (not shown). Many devices other than the key input unit or the display, for example, a mouse, can also be used.

Figure 9:
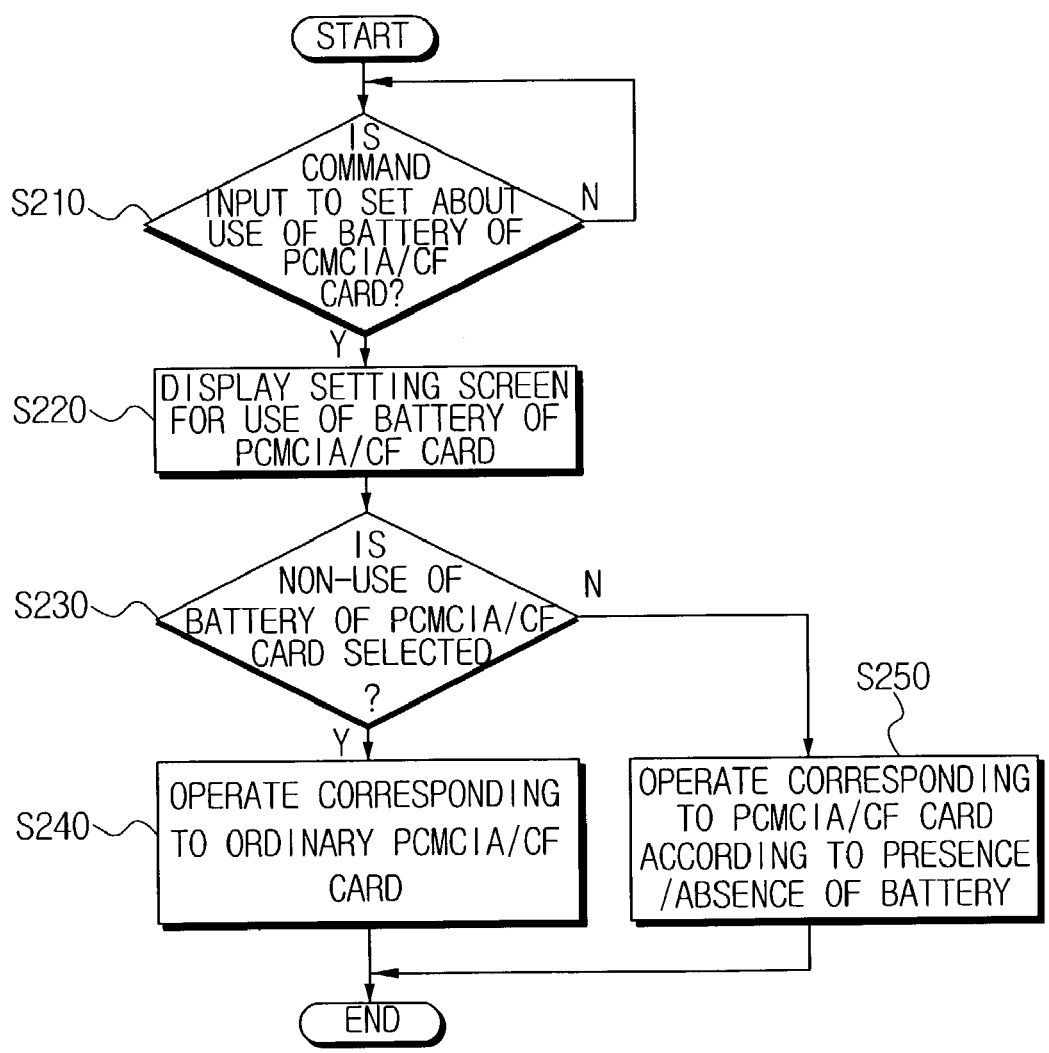
FIG. 9 is a flowchart showing a process of a controller in the host of FIG. 7, according to an embodiment of the present invention.

FIG. 9 is a flowchart showing the operation of the example controller included in the PCMCIA/CF card controller 130. When the user inputs a command through the user interface to set the use of the battery 210 of the PCMCIA/CF card 200 (step S210), a setting screen (not shown) may be displayed including a display of a use of the battery 210 of the PCMCIA/CF card 200 (operation S220). If the user determines not to use the battery 210 of the PCMCIA/CF card 200 through a selection tool on the setting screen, for example, (operation S230), the PCMCIA/CF card 200 is thereafter controlled to operate as an ordinary PCMCIA/CF card (operation S240). If there is no such designation to not use the battery 210 of the PCMCIA/CF card 200, the PCMCIA/CF card 200 is thereafter controlled to operate according to the aforementioned operations regarding presence/absence of the battery (operation S250).

As the above example indicates that power is supplied from the host 100 to the card type device 200 in pulse form, to more easily allow a detection of the presence of battery, often times, there are problems like initial operation retardation and related troubles. Such problems may be solved by the use of the aforementioned controller included in the PCMCIA/CF card controller 130, for example, by determining whether or not to use the battery 210 of the card type device 200. Using this controller included in the PCMCIA/CF card controller 130, can also solve a problem of inaccurate error detection, which especially occurs in a rare type of card type device or in new card type devices, as they may interpret the pulsed power supply as an error.

Figure 10:
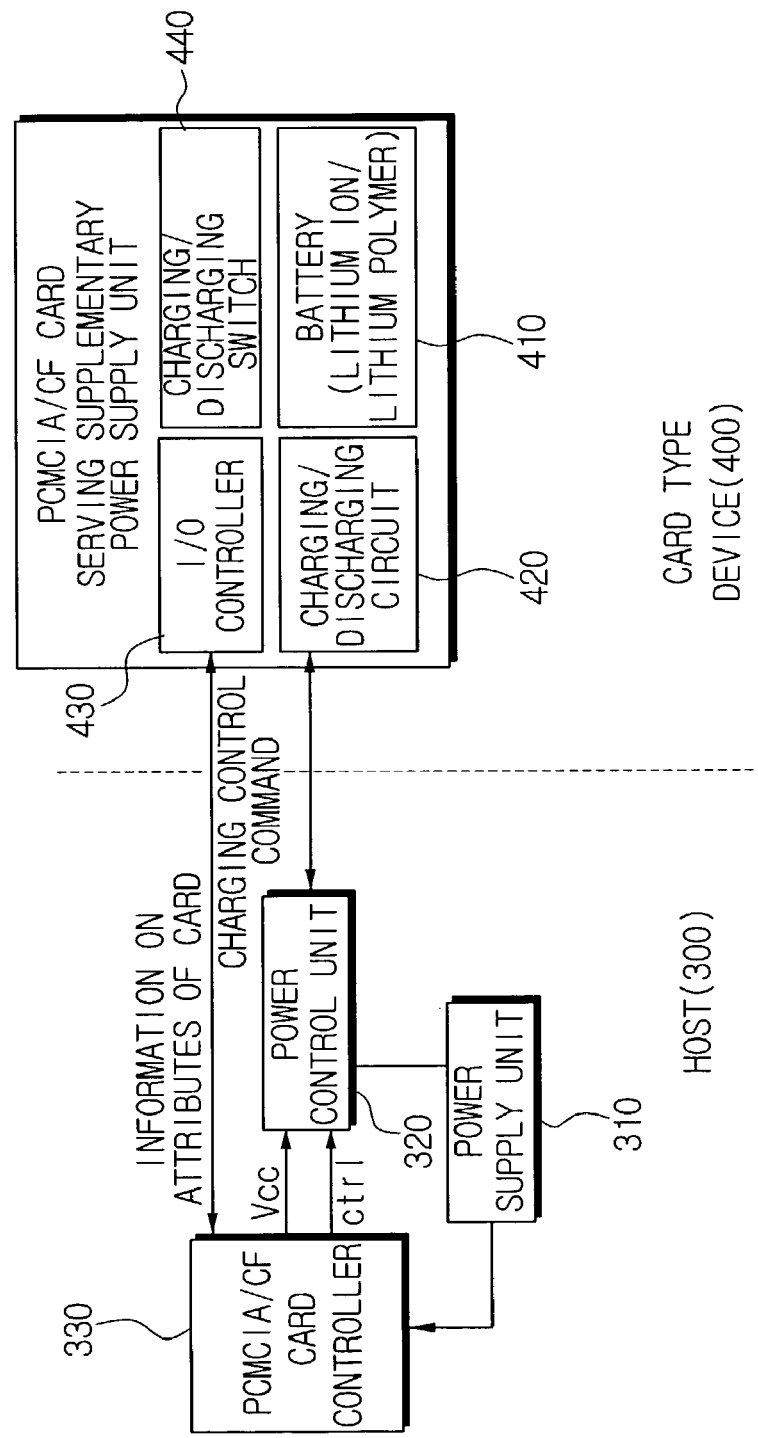
FIG. 10 is another block diagram showing a power interface between a PCMCIA or CF card and a host, according to another embodiment of the present invention.

FIG. 10 is a block diagram showing a power interface between a PCMCIA/CF card 400, serving as a supplementary power supply unit, and a host 300, and the use of the PCMCIA/CF card 400 according another embodiment of the present invention.

The PCMCIA/CF card 400, serving as the supplementary power supply unit, may include a battery 410 using a lithium ion battery or a lithium polymer battery, for example, a battery charging/discharging circuit 420 operating to charge/discharge the battery 410, an I/O controller 430 for interfacing information about the attributes of the host 300 and the battery 410 and control data, and a charging/discharge switch 430 for a manual control by a user of the operation of the battery charging/discharging circuit 420.

Being connected with the host 300, the I/O controller 430 provides the host 300 with the information on the attributes of the PCMCIA/CF card 400. Upon a receipt of a power supply request from the host 300, the I/O controller 430 converts the battery charging/discharging circuit 420 to a discharging circuit.

Referring to FIG. 7, the host 300 includes respective blocks, a power supply unit 310, a power control unit 320 and a PCMCIA/CF card controller 330.

The PCMCIA/CF card controller 330 is provided, from the I/O controller 430, with the information on the attributes of the connected PCMCIA/CF card 400. When the connected PCMCIA/CF card 400 is determined to include the charged battery 410, from the information on the attributes of the connected PCMCIA/CF card 400, a request for power supply is made to the I/O controller 430 of the PCMCIA/CF card 400. The power control unit 320 is then controlled to cut off the power from the power supply unit 310 to the PCMCIA/CF card 400, while the power control unit 420 is controlled such that the power supply unit 410 is charged with the power from the PCMCIA/CF card 400.

Figure 11:
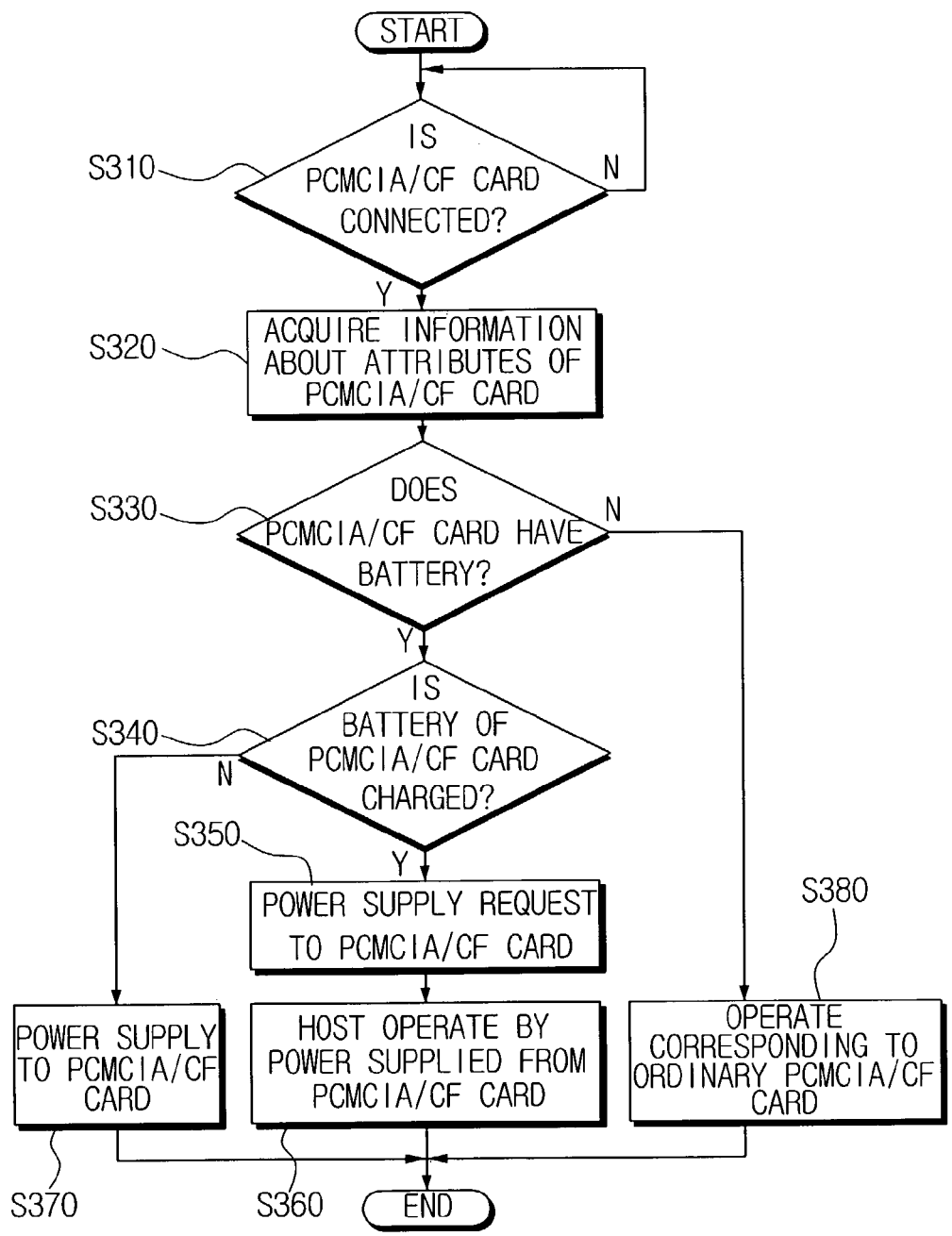
FIG. 11 is a flowchart showing a process of a controller of the PCMCIA or CF card of FIG. 10, according to an embodiment of the present invention.

FIG. 11 is a flowchart showing, in detail, processes of the PCMCIA/CF card controller 330 of FIG. 10. First, when the PCMCIA/CF card 400 is connected (operation S310), the PCMCIA/CF card controller 330 reviews the information of the attributes of the PCMCIA/CF card 400 (operation S320). When the information of the attributes of the PCMCIA/CF card 400 indicates that the PCMCIA/CF card 400 includes the battery 410 (operation S330), and when the battery 410 is detected to be in a charged state (operation S340), a request for power supply is made to the I/O controller 430 of the PCMCIA/CF card 400 (operation S350). Then the general operations of the host 300 are controlled to use the power supplied from the PCMCIA/CF card 400 (operation S360). That is, while the power control unit 320 is controlled to cut off the power supply from the power supply unit 310 to the PCMCIA/CF card 400, the power control unit 320 is also controlled such that the power supply unit 310 can be charged with the power from the PCMCIA/CF card 400.

In the above process, the supply of power from the PCMCIA/CF card 400 can be controlled to not be supplied to the power supply unit 310 via the power control unit 320, but instead to be directly supplied to the respective blocks (not shown) of the host 300 via a body interface (not shown).

Meanwhile, when it is determined that the PCMCIA/CF card 400 is an ordinary PCMCIA/CF card, the PCMCIA/CF card controller 330 performs the aforementioned operations corresponding to an ordinary PCMCIA/CF card (operation S380).

When the PCMCIA/CF card 400 is designated as the PCMCIA/CF card 400 serving as the supplementary power supply unit, and when the battery 410 is in a discharged state, power is supplied to the PCMCIA/CF card 400, so as to charge the battery 410 of the PCMCIA/CF card 400 (operation S370). For this, the PCMCIA/CF card controller 330 transmits a charging control command for conversion into a charging circuit to the I/O controller 430, to charge the battery 410 of the PCMCIA/CF card 400.

Figure 12:
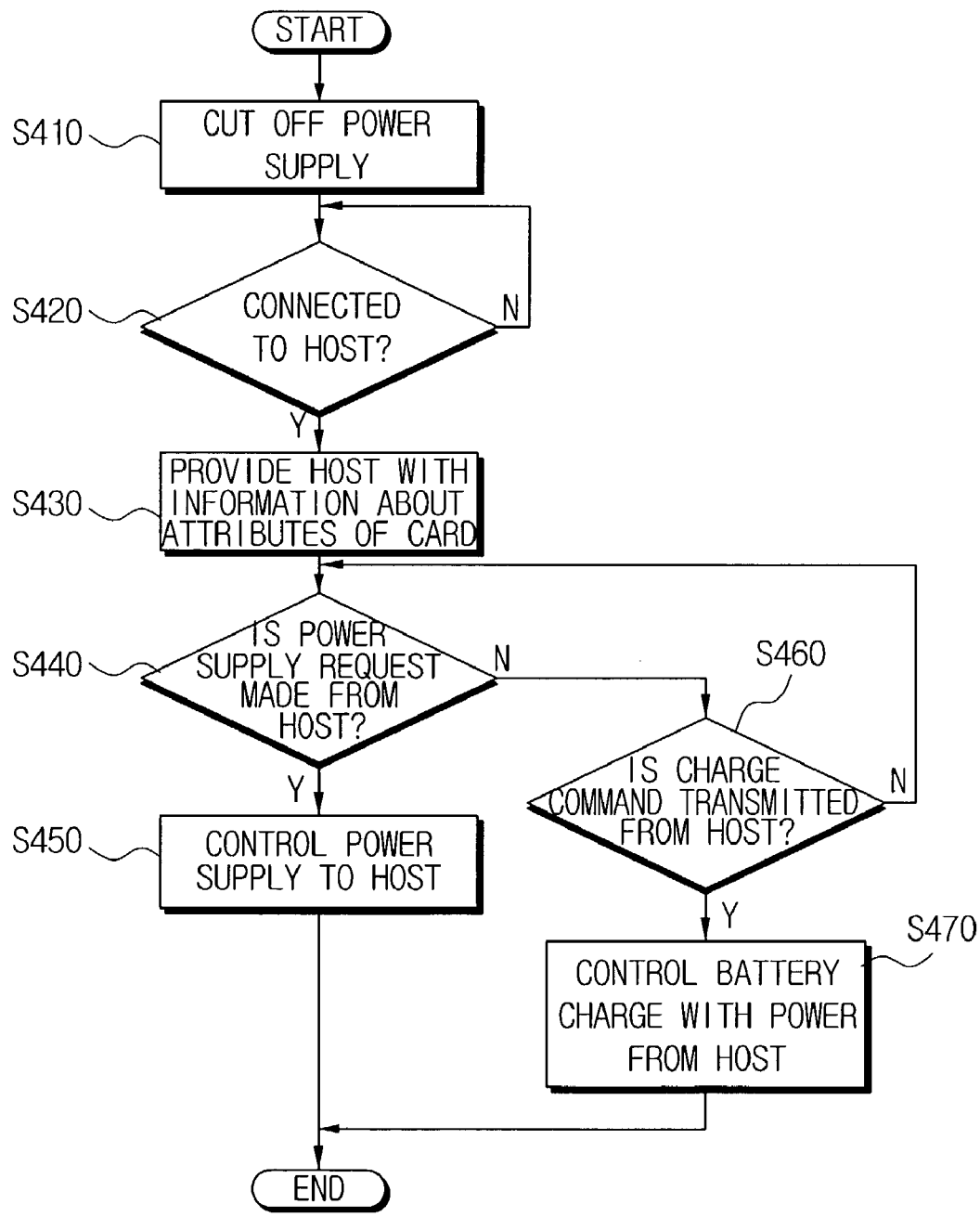
FIG. 12 is a flowchart showing a process of the I/O controller of FIG. 10, according to an embodiment of the present invention.

FIG. 12 is a flowchart showing the operations of the I/O controller 330 of the PCMCIA/CF card 400 of FIG. 10. The I/O controller 430 controls the operation of the charging/discharging circuit 420 so that the power of the battery is not supplied externally (operation S410). When the PCMCIA/CF card 400 is connected to the host 300 (operation S420), the information about the attributes of the PCMCIA/CF card 400, inclusive of the attributes of the battery 410, is provided to the host 300. Then when power supply is requested by the host 300, the charging/discharging circuit 420 is controlled to operate as the discharging circuit to supply power from the battery 410 to the host 300 (operation S450). When the charging control command is transmitted from the host 300 instead of through a power supply request (operation S460), the charging/discharging circuit 420 is controlled to operate as a charging circuit to charge the battery 410 with the power from the host 300 (operation S470).

Figure 13:
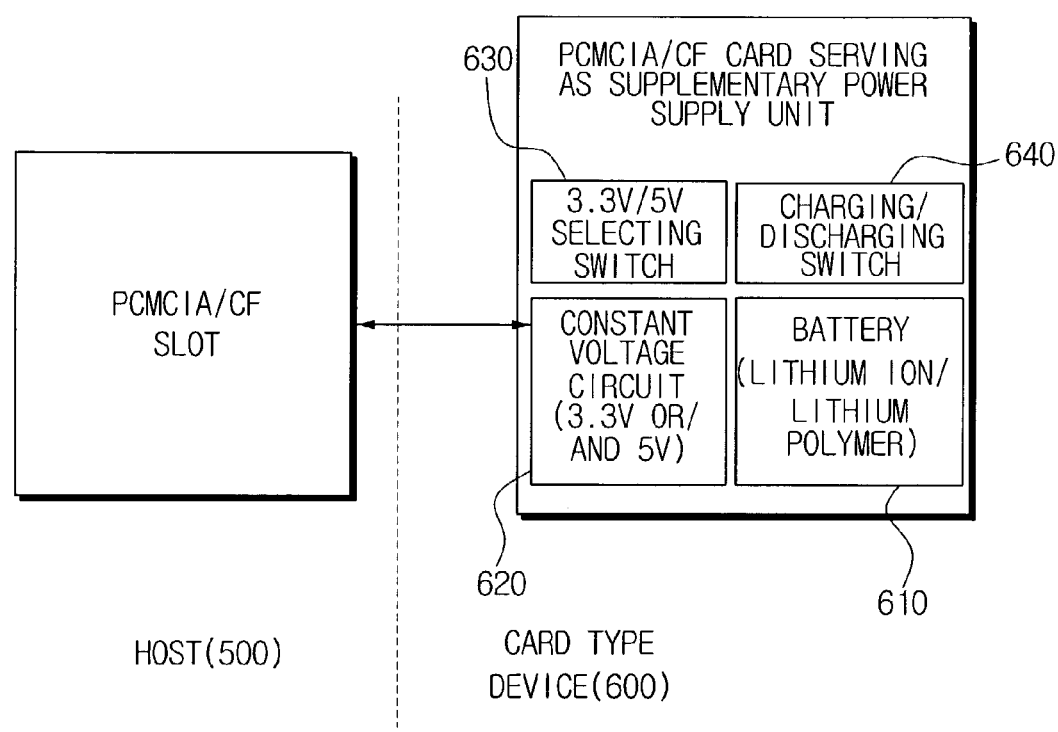
FIG. 13 is another block diagram showing a power interface between the PCMCIA or CF card and the host, according to another embodiment of the present invention.

FIG. 13 is a block diagram showing the power interface between a PCMCIA/CF card 600, serving as a supplementary power supply unit, and a host 500 using such PCMCIA/CF card 600.

The PCMCIA/CF card 600 includes a battery 610 using a lithium ion battery or a lithium polymer battery, for example, a constant voltage circuit 620 operating to supply the power from the battery 610 to outside of the PCMCIA/CF card 600 constantly, and to charge the battery 610 with externally supplied power, and a charging/discharging switch 430 for a user to manually control charging or discharging operations of the constant voltage circuit 620.

The constant voltage circuit 620 can have a plurality of constant voltage converting units (not shown) for converting and outputting power from the battery 610 into different constant voltages, and the PCMCIA/CF card 600 can further include a constant voltage selecting switch 630 for selectively outputting a certain constant voltage from among the plurality of constant voltage converting units. For example, the constant voltage circuit 620 can provide the constant voltages of 3.3V and 5V, for example, in a manner that one is selectively output through the manipulation on the 3.3V/5V selecting switch 630.

In the card type device serving as the supplementary power supply unit according to embodiments of the present invention, by the use of a lithium ion battery or a lithium polymer battery, for example, which can be made thin and slim, the battery can be installed in the card type device without having to vary the size of the card type device. Accordingly, while being capable of performing basic functions of the card type device, the card type device can also be used as a supplementary power supply unit for various components of a host. Thus a new card type device battery can be provided to different components that use the card type device.

Further, according to embodiments of the present invention, since the host using the card type device can be provided with supplementary power through an existent card slot, there is an increase in space utilization, and the use time of the host can be prolonged through the use of the widely used card formats including the card type device battery power supply.

Although embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A card type device serving as a supplementary power supply device, comprising:
    a battery provided in a frame of the card type device to serve as a supplementary power supply to a host;
    a connector to connect to the host for an interfacing of power and data to and/or from the host;
    a battery charging/discharging circuit to charge the battery with an input power supplied via the connector, and to output the power of the battery via the connector; and
    a power input/output controller to provide the host with information of attributes of the battery during a connection to the host, with the power input/output controller to control the battery charging/discharging circuit so that the power of the battery is supplied to the host when a request for power supply is transmitted from the host,
    wherein the power input/output controller controls the battery charging/discharging circuit so that the battery is charged with the input power when the battery is completely discharged,
    the battery charging/discharging circuit is a smart battery circuit,
    the smart battery circuit provides the host with information of attributes of the battery via an address pin of the connector, and
    the information of the attributes of the battery, provided to the host, comprises at least one of a battery voltage, a battery remnant, battery charging times, a battery manufacturer, and a battery manufacturing period.

2. A card type device serving as a supplementary power supply device, comprising:
    a battery provided in a frame of the card type device to serve as a supplementary power supply to a host;
    a connector to connect to the host for an interfacing of power and data to and/or from the host; and
    a battery charging/discharging circuit to charge the battery with an input power supplied via the connector, and to output the power of the battery via the connector,
    wherein the battery charging/discharging circuit is a constant voltage circuit operating to convert the power from the battery into a constant voltage and to output the constant voltage via the connector, and to charge the battery with the input power, and
    wherein the constant voltage circuit comprises:
        a plurality of constant voltage converting units to convert the power from the battery into different levels of constant voltages; and
        a constant voltage selecting switch to output the constant voltage, as selected from the plurality of constant voltage converting units, to a power terminal of the connector.

3. A host using a card type device serving as a supplementary power supply unit, comprising:
    a power supply unit to supply a power to respective components of a body, with the power being supplied from an output power of a card type device connected to the body;
    a power control unit to control an input power, supplied to the card type device, according to a control signal; and
    a card type device controller to control the power control unit to detect whether a battery is present in the card type device, to cut off the input power to the card type device when the card type device has the battery, and to charge the power supply unit with the output power supplied from the card type device,
    wherein, when the card type device is connected, the card type device controller supplies the input power as a pulsed power to allow for the detection of whether the battery is present in the card type device, and
    when a signal level of a LOW-region of the pulsed power is detected to be high, the card type device controller determines that the card type device includes the battery.

4. The host of claim 3, wherein, when the detected the signal level is not high, the card type device controller determines a type of the card type device based on an information of attributes of the connected card type device, and when the card type device is determined to have the battery, the card type device controller supplies the output power to the battery.

5. A host using a card type device serving as a supplementary power supply unit, comprising:

a power supply unit to supply a power to respective components of a body, with the power being supplied from an output power of a card type device connected to the body;

a power control unit to control an input power, supplied to the card type device, according to a control signal;

a card type device controller to control the power control unit to detect whether a battery is present in the card type device, to cut off the input power to the card type device when the card type device has the battery, and to charge the power supply unit with the output power supplied from the card type device;

a user interface provided for a user to designate whether the battery of the card type device is to be used to supply power; and a controller to cause the output power to be supplied to the card type device, irrespective of whether the card type device has the battery, in response to designation, through the user interface, that the battery of the card type device is not to be used to supply power.

6. A host using a card type device serving as a supplementary power supply unit, comprising:

a power supply unit to supply a power to respective components of a body, with the power being supplied from an output power of a card type device connected to the body;

a power control unit to control an input power, supplied to the card type device, according to a control signal; and a card type device controller to control the power control unit to detect whether a battery is present in the card type device, to cut off the input power to the card type device when the card type device has the battery, and to charge the power supply unit with the output power supplied from the card type device, wherein the card type device controller reviews the information of attributes of the card type device to detect whether the card type device has the battery, and in response to determining, based on the information of the attributes, that the card type device has the battery, the card type device controller transmits a power supply request signal to the card type device according to a charging level of the battery.

7. A method of operating a host with a connected card type device, comprising:

determining whether the card type device includes a power source;

controlling a power source of the host to provide a power for the host, when the card type device does not include a power source;

controlling the power source of the host and the power source of the card type device to provide the power to the host, when the card type device includes a power source; and supplying the power for the host to respective components of the host, wherein the determining whether the card type device includes the power source includes supplying a pulsed power to the card type device and reviewing whether a signal level of a low region of the pulsed power is high or low.

8. The method of claim 7, further comprising:

automatically, in response to determining that the card type device includes a power source, controlling the power of the host to be from only the power source of the host when the power source of the card type device is discharged.

9. The method of claim 8, wherein the determination of the discharge of the power source of the card type device is determined by a smart battery circuit.

10. The method of claim 8, further comprising:

providing power from the host to the card type device to charge the power source of the card type device.

11. The method of claim 7, further comprising:

automatically controlling the power of the host to only be from the power source of the card type device when the power source of the card type device is charged.

12. The method of claim 11, wherein the determination of the charge of the power source of the card type device is determined by a smart battery circuit.

* * * * *